GUARDING CIRCUIT FOR TELEPHONE SYSTEMS

Filed April 28, 1953 4 Sheets-Sheet 1

INVENTOR.
WILLIAM W. PHARIS
BY Francis E. Blake
ATTORNEY

INVENTOR.
WILLIAM W. PHARIS
BY Francis E. Blake
ATTORNEY

Oct. 2, 1956 W. W. PHARIS 2,765,369

GUARDING CIRCUIT FOR TELEPHONE SYSTEMS

Filed April 28, 1953 4 Sheets-Sheet 3

INVENTOR.
WILLIAM W. PHARIS

BY Francis I. Blake

ATTORNEY

Oct. 2, 1956 W. W. PHARIS 2,765,369

GUARDING CIRCUIT FOR TELEPHONE SYSTEMS

Filed April 28, 1953 4 Sheets-Sheet 4

INVENTOR.
WILLIAM W. PHARIS

BY Francis E. Blake

ATTORNEY 2,765,369

GUARDING CIRCUIT FOR TELEPHONE SYSTEMS

William W. Pharis, Rochester, N. Y., assignor, by mesne assignments, to General Dynamics Corporation, a corporation of Delaware Application April 28, 1953, Serial No. 351,601

6 Claims. (Cl. 179—18)

This invention relates to telephone systems and more particularly to an arrangement for preventing undesired seizure of interoffice trunking apparatus.

One-way trunking facilities may be provided to interconnect a remote call originating office having automatic switching equipment or call originating circuits and a local call terminating office having a manual switchboard or the like. Such one-way trunking facilities, in the interests of simplicity and economy, are not normally provided with equipment whereby the terminating office may initially seize the trunking facilities and busy the equipment at the remote originating office to prevent undesired seizure of the trunking facilities by the automatic switching means or call originating circuits at such originating office. Under certain conditions, such as failure of the equipment at the terminating office, it is desirable to provide an arrangement whereby the terminating office may guard the one-way trunking facilities against seizure by the automatic switching equipment at the remote call originating office.

It is an object of my invention to provide new and improved one-way trunk facilities.

Another object of my invention is to provide for the application of guarding means at a terminating office of one-way trunking facilities to prevent the undesired seizure of the trunking facilities at the originating office.

A feature of the invention is the provision of a line relay connected to the one-way trunk line in the trunk circuit of the remote call originating office and operated by closure of a loop across the tip and ring conductors of the trunk line or the associated trunk circuit facilities at the local call terminating office, the operation of the relay being effective to connect a busy guarding ground or other suitable guarding condition to the guarding sleeve conductor leading to the contact banks of the automatic switching equipment or other call originating circuits at the remote office having access to the one-way trunk line, thus preventing undesired seizure of the trunk line by the automatic equipment at the call originating office.

Figure 1:
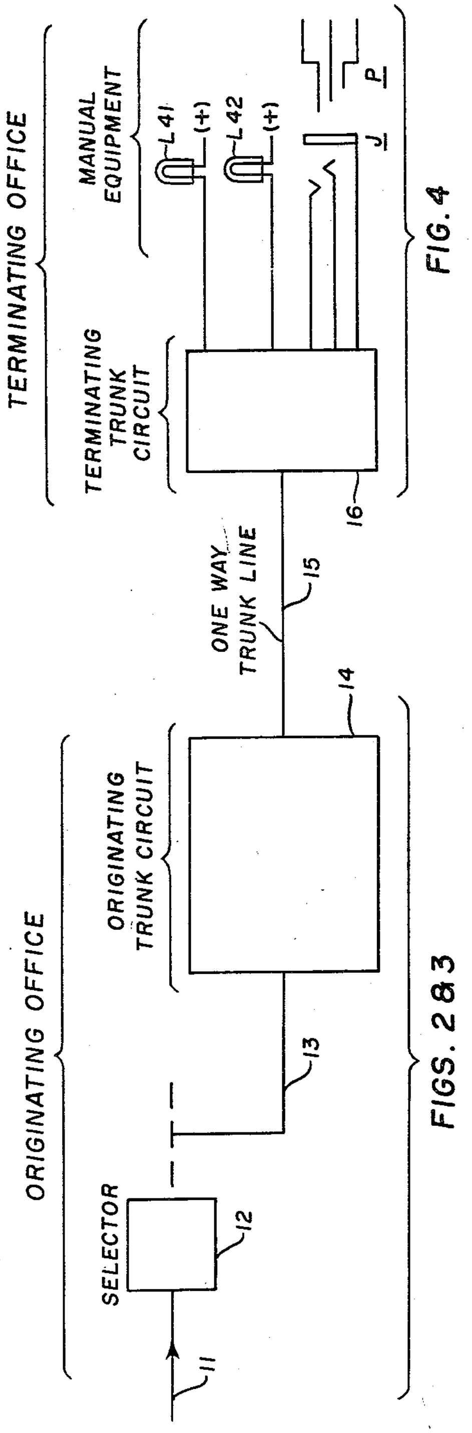
Figure 2:
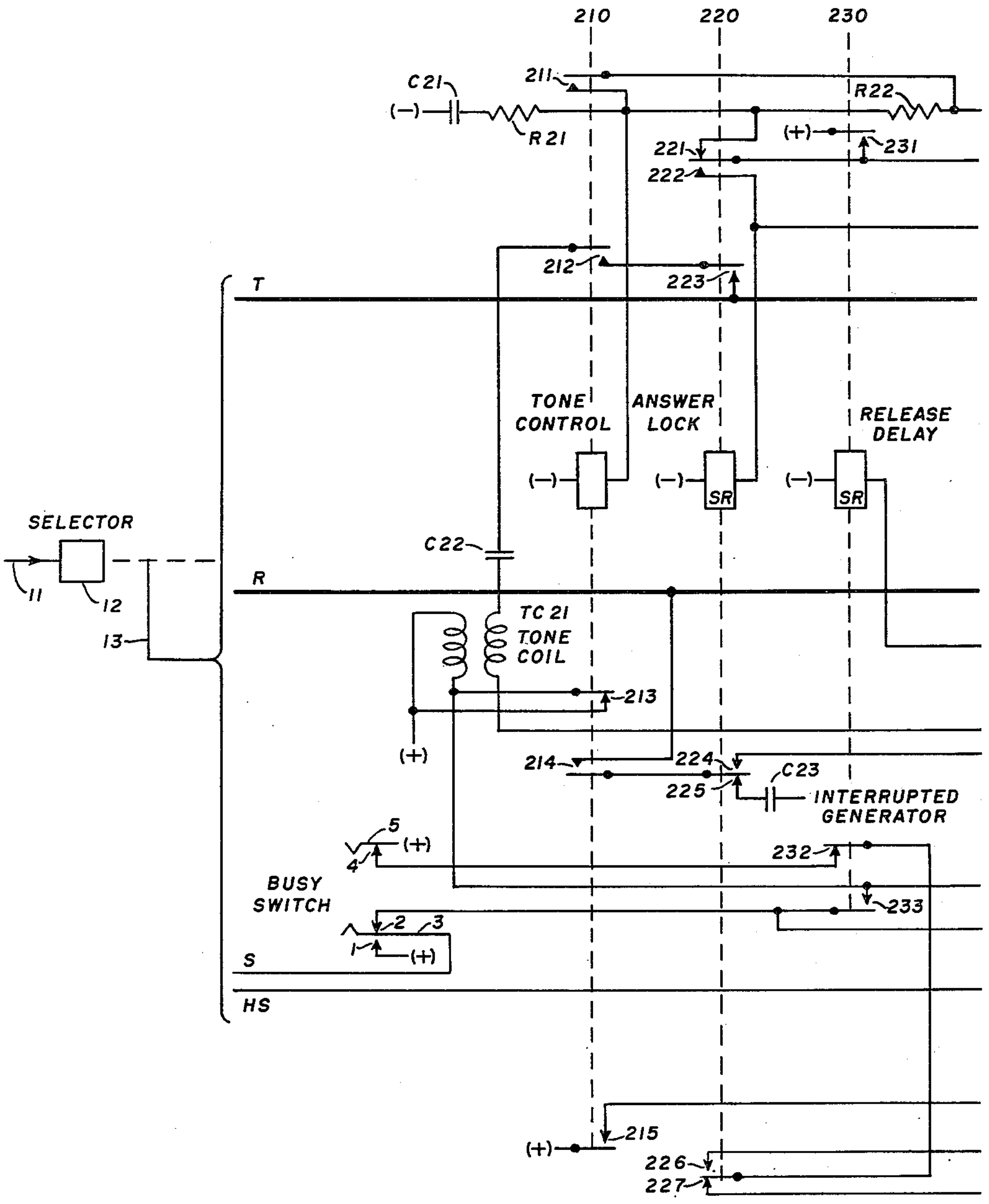
Figure 3:
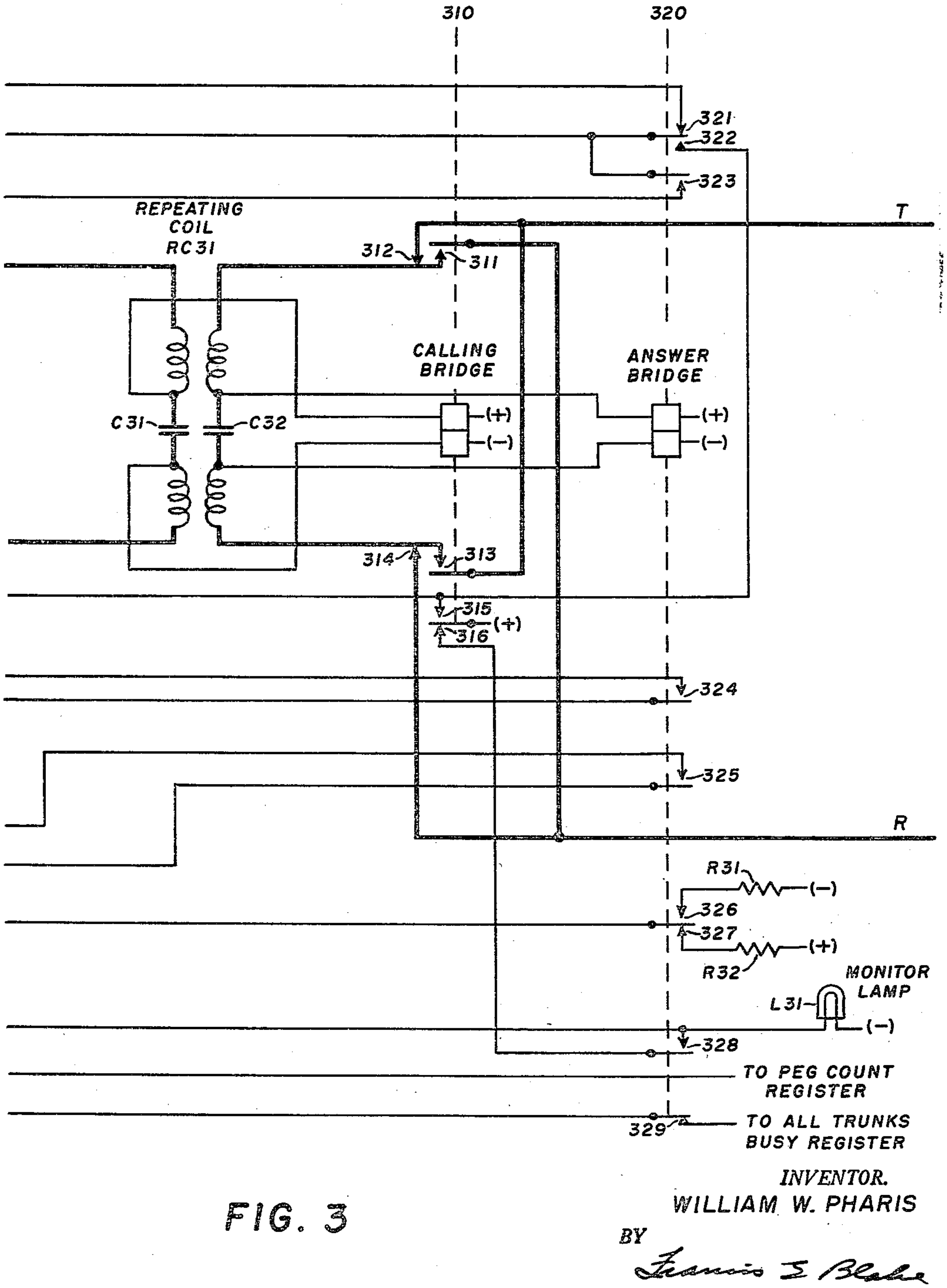
Figure 4:
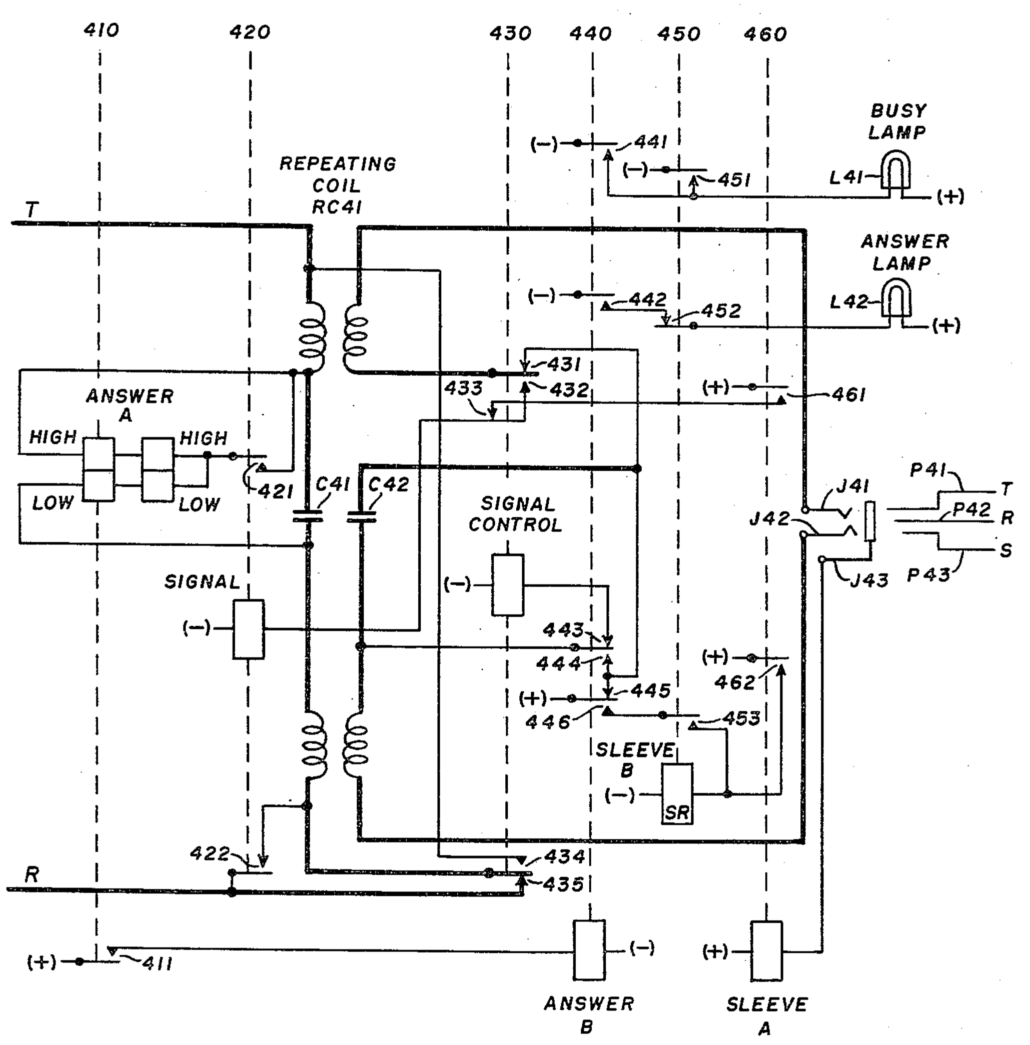

Further objects, features and the attending advantages of the invention will be apparent with reference to the following specification and drawings in which:

Fig. 1 is a block diagram of a telephone system embodying the invention,

Fig. 2 is a schematic diagram of the incoming portion of a trunk circuit connected to contact banks of an automatic selector switch at a call originating office, Fig. 3 is a schematic diagram of the remaining portion of the trunk circuit of Fig. 2 and connecting to a one-way trunk line, and Fig. 4 is a schematic diagram of the trunk circuit at the manual call terminating office for the one-way trunk line connected back to the call originating trunk circuits of Figs. 2 and 3.

A block diagram of a typical telephone system to which the invention applies is shown in Fig. 1. Calls originating over the line 11 to the selector 12 may be connected by line 13 from the selector banks to the originating truck circuit 14 in the originating office. It should be understood that a plurality of call originating circuits, not shown, will have access to the selector 12 and that, also, a plurality of slectors such as the selector 12 may have access to the trunk circuit 14. The calls are then connected over the one-way trunk line 15 to the terminating trunk circuit in the terminating office. The terminating office is shown to be a manual type and the terminating trunk circuit 16, therefore, connects with the operator's jack J and plug P and to the operator's signal lamps L41 and L42.

There follows a detailed description of a call through the apparatus and one-way trunk line shown in Fig. 1 and utiling the various components enumerated previously.

Assuming that a call originates so that the selector switch 12 is actuated in the usual manner by way of conductors generally shown at 11, the selector 12 is stepped so that it is eventually connected to bank terminal contacts 13 which connect to the trunk circuit conductors T, R, S and HS, as shown in Fig. 2. The conductors T and R are controlled by a loop circuit in the well known manner, and calling bridge relay 310 of the trunk circuit is energized from ground, shown as (+), through the upper winding of relay 310, through a winding of the repeating coil RC31, the conductor T, calling party's loop across conductors T and R, the conductor R, and through another winding of the repeating coil to the lower winding of relay 310 and to battery, shown as (—).

The operation of calling bridge relay 310 energizes the release delay relay 230 from ground through operated contacts 315, and through the winding of relay 230 to battery. The release delay relay 230 has a slow-release characteristic so that it remains operated during any subsequent call procedure.

Operation of relay 230 connects busy holding ground to the incoming busy guarding sleeve conductor S from ground through the primary winding of tone coil TC21, operated contacts 233 and busy switch contacts 2 and 3. It will be noted that busy holding ground may also be connected to the sleeve conductor S through operated contacts 325 of the answer bridge relay 320, when such relay is operated.

Operation of the release delay relay 230 also energizes the paystation tone control relay 210 from ground through operated contacts 231, normally closed contacts 221, and through the winding of relay 210 to battery.

Operation of the tone control relay 210 lights monitor lamp L31 from ground through operated contacts 215, and through lamp L31 to battery. Operation of relay 210 also connects the interrupted generator lead through capitor C23, normally closed contacts 225, and through operated contacts 214 to the incoming conductor R, to provide a tone to the calling party to indicate the desired seizure of this one-way trunk circuit. Operation of relay 210 also opens the shunting circuit at operated contacts 213 for part of the tone coil TC21 so that a paystation identification tone, if present on the conductor S, may be heard when the terminating operator at the equipment of Fig. 4 answers. Operation of relay 210 also closes a multiple holding circuit for itself through operated contacts 231, normally closed contacts 321, operated contacts 211, and through the winding of relay 210 to battery.

The previously described operation of the calling bridge relay 310 also reverses the direction of the battery flow from the answer bridge relay 320 of the originating trunk circuit of Fig. 3 to the polarized answer A relay 410 of the terminating trunk circuit of Fig. 4, so that the latter relay will now operate.

Operation of the polarized relay 410 energizes the answer B relay 440 from ground, through operated contacts 411 and through the winding of relay 440 to battery. Operation of the answer B relay 440 lights the busy lamp L41 from battery through operated contacts 441, and through the busy lamp L41 to ground.

The busy lamp L41 will also be lighted, by battery through operated contacts 451, when the sleeve B relay 450 operates as the operator answers. The aforementioned operation of the answer B relay 440 also lights the answer lamp L42 from battery through operated contacts 442, normally closed contacts 452, and through the answer lamp L42 to ground, to signal the waiting operator accordingly.

When the operator answers, the sleeve A relay 460 is energized by battery from the cord circuit through jack sleeve J43, and through the winding of relay 460 to ground. Operation of the sleeve relay 460 energizes the sleeve B relay 450 from ground through operated contacts 462, and through the winding of relay 450 to battery. The operation of the sleeve B relay 450 extinguishes the answer lamp L42 by opening its operating circuit at contacts 452. Operation of the sleeve A relay 460 also energizes signal relay 420 from ground through operated contacts 461, normally closed contacts 433, and through the winding of relay 420 to battery. The operation of the signal relay 420 short circuits the high resistance portions of the windings of the high-low resistance polarized answer A relay 410 at operated contacts 421, and closes a multiple circuit, at contacts 422, across contacts 435 of the signal control relay 430. The answer bridge relay 320 at the call originating trunk circuit of Fig. 3 now operates from ground through its upper winding and through the winding of repeating coil RC31, operated contacts 311, trunk line R conductor, operated contacts 422, winding of repeating coil RC41, low resistance windings of answer A relay 410, operated contacts 421, winding of repeating coil RC41, operated contacts 313, winding of repeating coil RC31, and through the lower winding of relay 320 to battery.

The operation of the answer bridge relay 320 removes ground, through the resistor R32 and previously closed contacts 327, from the conductor HS and connects battery through resistor R31 and operated contacts 326 to the conductor HS, to produce visual answer indication through the selector switch equipment, etc. (not shown), to the calling operator. Operation of the answer bridge relay 320 also energizes the answer lock relay 220 from ground through operated contacts 231 and 323, and through the winding of relay 220 to battery. This relay 220 has a slow-release characteristic which is used to momentarily operate the pegcount register (not shown) through busy switch contacts 4 and 5, normally closed contacts 232, momentarily closed contacts 226, and to battery through the pegcount register, during the subsequent final release of the connection. The aforementioned operation of the answer lock relay 220 also closes contacts 222 to lock itself from ground through contacts 231 of the release delay relay 230. Operation of relay 220 also opens the holding ground for the circuit of the tone control relay 210 at contacts 221. Relay 210 remains operated for a time interval due to the retarding influence of the discharge circuit for the electrolytic capacitor C21 through resistor R21.

After the answer lock relay 220 operates and before the tone control relay 210 finally restores, any paystation tone on conductor S will be induced, through the windings of the tone coil TC21, to the incoming conductors T and R from conductor T through operated contacts 223 and 212, capacitor C22, tone coil TC21, operated contacts 324, 224 and 214, to conductor R. When the tone control relay 210 finally restores, the monitor lamp L31 is extinguished by the removal of ground at contacts 215. The monitor lamp L31 relights, if the calling bridge relay 310 restores before the answer bridge relay 320, from ground through closed contacts 316 and operated contacts 328. Both the release delay relay 230 and the answer lock relay 220 remain operated while either the calling bridge relay 310 or the answer bridge relay 320 remains operated through operated contacts 315, or 322 and 323.

At the conclusion of the call, the calling bridge relay 310 is usually restored first by the calling party hanging up to open the loop circuit on the incoming conductors T and R. Restoration of this relay 310 re-reverses the direction of the current flow to the polarized answer A relay 410, by means of contacts 311 and 312 to the T conductor and contacts 313 and 314 to the R conductor. The subsequent restoration of relay 410 restores the answer B relay 440 to reconnect ground to the T conductor and J41, through normally closed contacts 445 and 431, and through a winding of the repeating coil RC41, and to reconnect battery through signal control relay 430, normally closed contacts 443, and through a winding of the repeating coil RC41 to the R conductor and J42. This reversal of current to the cord circuit signals the operator, in the usual manner, for the release of the connection by the removal of the inserted plug.

With the calling bridge relay 310 restored, the answer bridge relay 320 remains operated until the signal relay 420 is restored, which is obtained as the operator releases the sleeve A relay 460 to open contacts 461, by removing the answering plug at the conclusion of the call. The restoration of the answer bridge relay 320 also restores the release delay relay 230, to remove the busy holding and guarding ground from the incoming conductor S and to also restore all other apparatus used in the connection.

According to the invention, with no incoming call holding this equipment in a busy condition at the originating trunk circuit of Figs. 2 and 3 of the drawings, the answering operator may insert the plug having elements P41, P42 and P43 into the jack comprising elements J41, J42 and J43, to operate sleeve A relay 460 and sleeve B relay 450, as previously described. Operation of relay 460 will, in turn, operate the signal relay 420 by closing contacts 461, and this operation of relay 420 closes the low resistance loop of the high-low polarized relay 410 through operated contacts 421, to operate the answer bridge relay 320, as previously described. Such operation of relay 320 will close ground through contacts 325 to the incoming sleeve conductor S, to thus guard this one-way trunk equipment from seizure by the automatic selector switch at the call originating office.

While I have shown and described a particular embodiment of my invention, it will be obvious to those skilled in the art that changes and modifications may be made without departing from my invention in its broader aspects. For example, any other suitable arrangements for closing a loop across the trunk line tip and ring conductors by equipment at the terminating office may be used to operate a relay at the originating office such as the answer bridge relay 320. Therefore, the high-low resistance polarized relay 410 is not essential to such modified form of the invention. It is intended that the appended claims cover all such changes and modifications as fall within the true spirit and scope of the invention.

In the appended claims the term "busy guarding potential" is intended to refer to any suitable arrangement such as the conventional grounded positive potential of the station battery or the unconventional alternating current busy guarding potential. It is also intended that the term "busy guarding potential" in the claims be descriptive of the arrangement in which absence of ground, or zero potential, may be used to indicate the busy condition of the equipment.

What I claim is:

1. A telephone system including in combination, a first office, a second office, a one way trunk line connected between said first and second offices, a busy guarding conductor for said trunk line at said first office, a source of busy guarding potential, means to connect said busy guarding potential to said conductor to prevent seizure of said trunk line by said first office, a relay in said first office, said relay being connected to said trunk line to be operated by a loop circuit across said trunk line, said relay having contacts operable to also complete a circuit to connect said busy guarding potential to said conductor, and means in said second office to close a loop circuit across said one way trunk line to thereby prevent seizure of said trunk line for a call originating in said first office.

2. A telephone system including in combination, a call originating office having one or more call originating circuits, a call terminating office, a one way trunk line, a first trunk circuit in said call originating office, a second trunk circuit in said call terminating office, said trunk line being connected between said first and second trunk circuits, a busy guarding conductor in said first trunk circuit, a source of busy guarding potential, means to connect said busy guarding potential to said conductor to prevent seizure of said first trunk circuit, a relay in said first trunk circuit, said relay being connected to said trunk line to be operated by a loop circuit across said trunk line, said relay having contacts operable to also complete a circuit to connect said busy guarding potential to said conductor, and means in said second trunk circuit to close a loop circuit across said one way trunk line to thereby prevent seizure of said first trunk circuit by any of said call originating circuits.

3. A telephone system including in combination, a call originating office having one or more call originating selector switch circuits, a call terminating office, a one way trunk line, a first trunk circuit in said call originating office, a second trunk circuit in said call terminating office, said trunk line being connected between said first and second trunk circuits, said first trunk circuit being connected to a set of contact terminals in each of said selector switches, a busy guarding conductor in said first trunk circuit connected to one of the selector switch contact terminals in each of said set of terminals for said first trunk circuit, a source of busy guarding potential, means to connect said busy guarding potential to said conductor, each of said selector switch circuits having means responsive to prevent seizure of said first trunk circuit in the event the busy guarding potential is connected to said conductor, a relay in said first trunk circuit, said relay being connected to said trunk line to be operated by a loop circuit across said trunk line, said relay having contacts operable to also complete a circuit to connect said busy guarding potential to said conductor, and means in said second trunk circuit to close a loop circuit across said one way trunk line to thereby prevent seizure of said first trunk circuit by any of said call originating selector switch circuits.

4. A telephone system including in combination, a call originating office having one or more call originating circuits, a call terminating office, a one way trunk line, a first trunk circuit in said call originating office, a second trunk circuit in said call terminating office, said trunk line being connected between said first and second trunk circuits, a busy guarding conductor for said first trunk circuit in said call originating office, a source of busy guarding potential, means to connect said busy guarding potential to said conductor for preventing seizure of said first trunk circuit by a call originating circuit, an answer bridge relay in said first trunk circuit, said relay being connected to said trunk line to be operated by a loop circuit across said trunk line when a call to said terminating office is answered, said answer bridge relay also having contacts operable to also complete a circuit to connect said busy guarding potential to said conductor in the event a loop is closed across said trunk line at said second trunk circuit before a call is extended from said first trunk circuit to said second trunk circuit.

5. A telephone system including in combination, a call originating office having one or more call originating circuits, a call terminating office, a one way trunk line, a first trunk circuit in said call originating office, a second trunk circuit in said call terminating office, said trunk line being connected between said first and second trunk circuits, a busy guarding conductor for said first trunk circuit in said call originating office, a source of busy guarding potential, means to connect said busy guarding potential to said conductor for preventing seizure of said first trunk circuit by a call originating circuit, an answer bridge relay in said first trunk circuit, said relay being connected to said trunk line to be operated by a loop circuit across said trunk line when a call to said terminating office is answered, said answer bridge relay also having contacts operable to complete a circuit to also connect said busy guarding potential to said conductor in the event a loop is closed across said trunk line at said second trunk circuit before a call is extended from said first trunk circuit to said second trunk circuit, and means in said call terminating office to close a loop circuit across said one way trunk line to thereby prevent seizure of said first trunk circuit by any of said call originating circuits 6. A telephone system including in combination, a call originating office having one or more call originating selector switch circuits, a call terminating office, a one way trunk line, a first trunk circuit in said call originating office, a second trunk circuit in said call terminating office, said trunk line being connected between said first and second trunk circuits, said first trunk circuit being connected to a set of contact terminals in each of said selector switches, a busy guarding conductor in said first trunk circuit connected to one of the selector switch contact terminals in each of said set of terminals for said first trunk circuit, a source of busy guarding potential, means to connect said busy guarding potential to said conductor, each of said selector switch circuits having means responsive to prevent seizure of said first trunk circuit in the event the busy guarding potential is connected to said conductor, an answer bridge relay in said first trunk circuit, said relay being connected to said trunk line to be operated by a loop circuit across said trunk line when a call to said terminating office is answered, said answer bridge relay also having contacts operable to also complete a circuit to connect said busy guarding potential to said conductor in the event a loop is closed across said trunk line at said second trunk circuit before a call is extended from said first trunk circuit to said second trunk circuit, and means in said second trunk circuit to close a loop circuit across said one way trunk line to thereby prevent seizure of said first trunk circuit by any of said call originating selector switch circuits.

References Cited in the file of this patent

UNITED STATES PATENTS

| | | |
|---|---|---|
| Re. 17,666 | Hinrichen | May 13, 1930 |
| 2,225,478 | Hovland | Dec. 17, 1940 |
| 2,614,173 | Bakker | Oct. 14, 1952 |
| 2,614,174 | Balzer | Oct. 14, 1952 |